United States Patent [19]

Cousino

[11] Patent Number: 4,947,279

[45] Date of Patent: Aug. 7, 1990

[54] MINIATURE CONTINUOUS TAPE LOOP CARTRIDGE HAVING TAPE WITHDRAWING OPENING

[75] Inventor: Bernard A. Cousino, Fort Myers, Fla.

[73] Assignee: Cousino Microloop Corporation, Toledo, Ohio

[21] Appl. No.: 204,212

[22] Filed: Jun. 8, 1988

[51] Int. Cl.⁵ .......................................... G11B 23/027
[52] U.S. Cl. ............................. 360/132; 292/55.19 A; 292/199
[58] Field of Search ................ 360/132; 242/55.19 A, 242/199

[56] References Cited

U.S. PATENT DOCUMENTS

| | | |
|---|---|---|
| 2,911,215 | 11/1959 | Cousino . |
| 2,921,787 | 1/1960 | Cousino . |
| 2,922,642 | 1/1960 | Cousino . |
| 3,030,041 | 4/1962 | Cousino . |
| 3,420,461 | 1/1963 | Cousino . |
| 3,420,463 | 1/1969 | Cousino . |
| 3,483,591 | 4/1969 | Becker et al. . |
| 4,283,022 | 8/1981 | Chen ................ 242/55.19 A |

Primary Examiner—A. J. Heinz
Attorney, Agent, or Firm—Emch, Schaffer, Schaub & Porcello Co.

[57] ABSTRACT

A miniature continuous magnetic tape loop cartridge designed for heavy duty "fool proof" usage in message repeaters. It embodies a loading spindle for fast production loading, and spill chambers and a stripping post for protection against tape tangles and feed out. An editing slot is provided for tape loop retrieval, fast editing for tape messages and stop intervals.

11 Claims, 5 Drawing Sheets

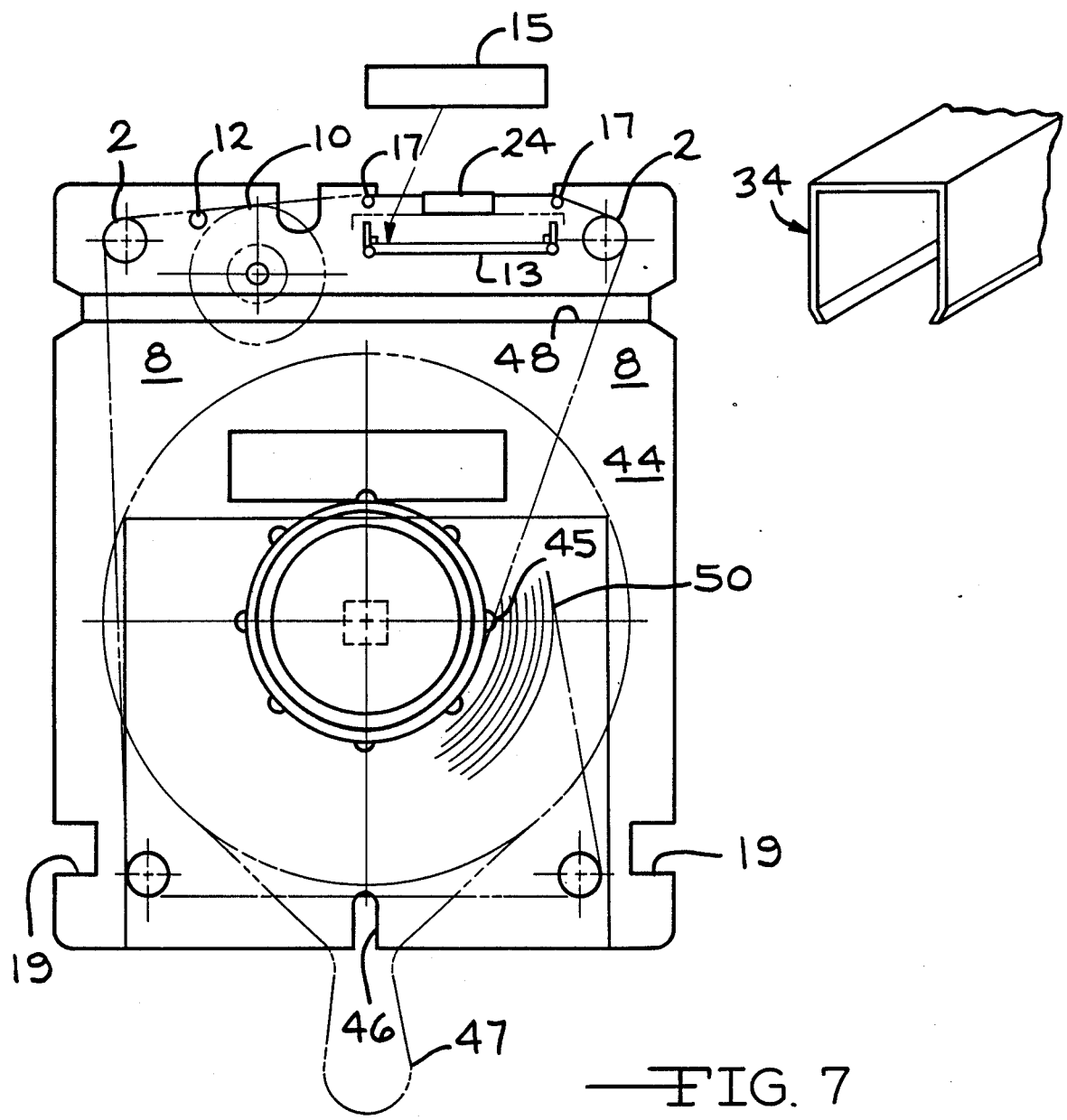

MINIATURE CONTINUOUS TAPE LOOP CARTRIDGE HAVING TAPE WITHDRAWING OPENING

BACKGROUND OF THE INVENTION

The present invention relates to a miniature continuous magnetic tape loop cartridge suitable for use in compact devices such as point of sales displays, or spot announcements in super markets, or in stuffed animals, such as talking teddy bears.

It is known in the prior art to use continuous tape loops in eight track tape music cartridges and in modified cassette tape cartridges. The eight track is often too large for compact applications and the cassette models are often too complicated and unreliable when modified to play continuous tape loops.

In prior art cartridge attempts to miniaturize the cartridge tapes have often had a tendency to feed out of the cartridge. The tape loops are difficult to restore without disassembling and damaging the cartridge case.

Microchips have entered the market for short audio messages but cannot match the economy and convenience of on-the-spot recording of messages by erasing and reusing the same tape.

SUMMARY OF THE INVENTION

The present development for an improved miniature, endless tape cartridge, provides advanced features to avoid tape "feed out" and internal tape tangles. It also provides a means for fast and automatic loading, tape splicing and editing, after loading, without opening the cartridge.

For example, tape feed-out is limited by a stripper post at the pressure roller as the tape is moved forward into a "spill chamber".

Inner tape tangles are avoided by recessing the tape disk into the cartridge base so as be flush with the tape spill chambers. An additional guard against tape tangles is a plastic ring protruding from the cover into the cone top to prevent tape loops from working their way across the cone top. A tapered bearing seat on the tape disk provides a self seating action for smooth rotation to held avoid flutter and wow.

The cartridge provides a press fit on four corner posts for assembly and a self tapping screw through the base to the cover. This permits opening the cartridge without destroying the cover label recessed on the top. A "key-flange" is molded on one side of the cartridge to insure proper placement into the player. Finger grip notches are molded on the back edges that also serve for stacking cartridges on a rail for automatic players.

A top and bottom groove is provided at the front of the cartridge to receive a protective tape guard for shipping and storage. These grooves also serve for numerical storage in shelf racks designed with numbered storage cells. A ramp notch is provided at the outside edge of said grooves to serve as index notches to hold the cartridge into play position. The front cavity for a tape head is provided with a leaf-spring mounted felt pressure pad and a groove to hold a MU-METAL shield.

BRIEF DESCRIPTION OF THE DRAWINGS

FIG. 1 is a perspective view of the inside cartridge base;

FIG. 2 is a top view of the tape disk showing the relationship between the cartridge base and disk;

FIG. 7 is a top view of the assembled cartridge showing, in phantom, the tape path and also showing the editing slot and a shipping shield.

DETAILED DESCRIPTION OF THE PREFERRED EMBODIMENTS

Figures 1, 2:
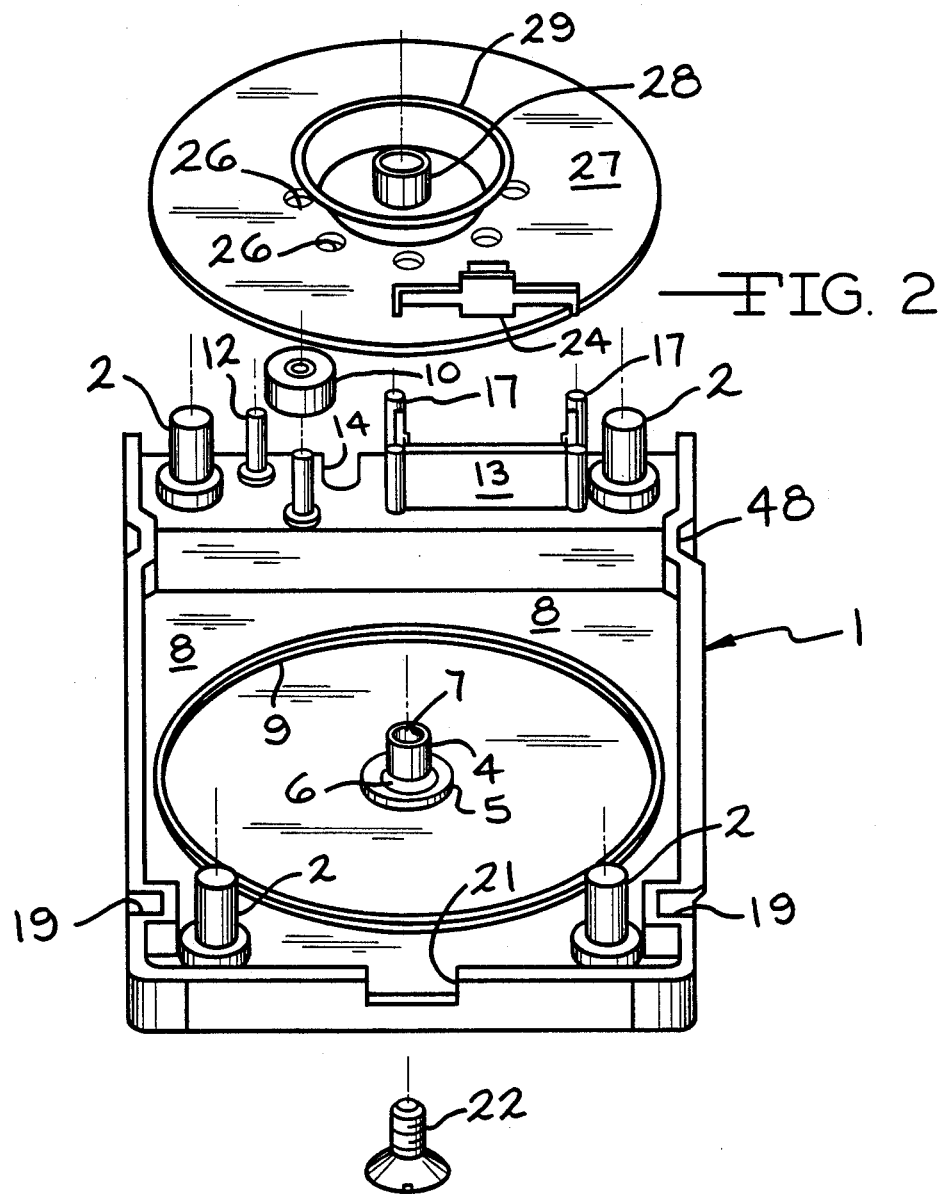
FIGS. 1 and 2 are exploded views of the tape cartridge, according to the present invention.
Figure 3:
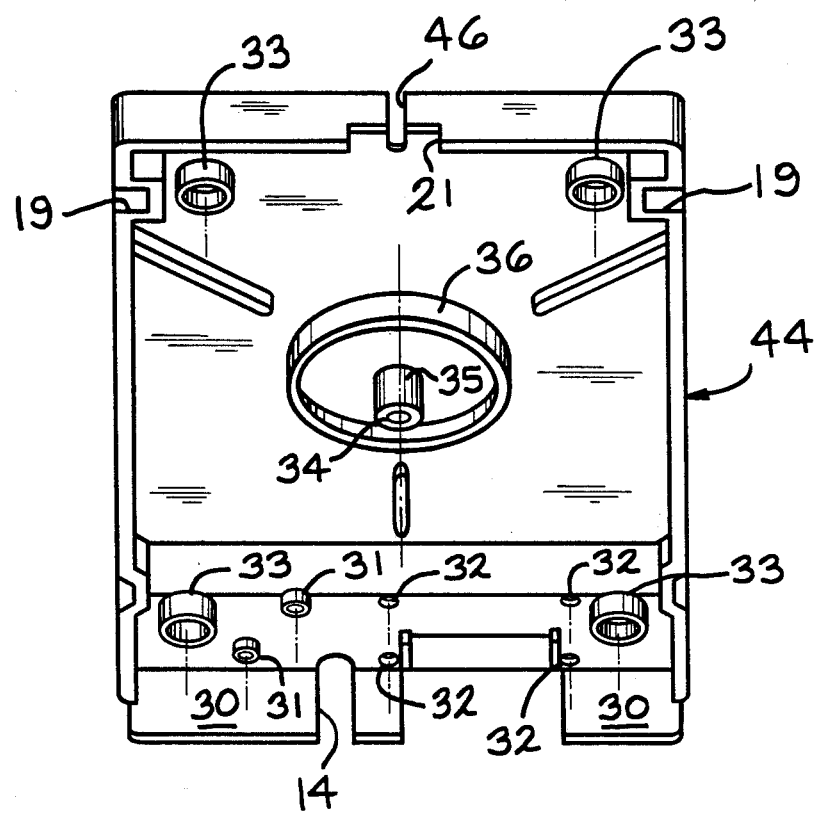
FIG. 3 is a perspective view of the cover inside showing the relationship to the disk and base.
Figure 6:
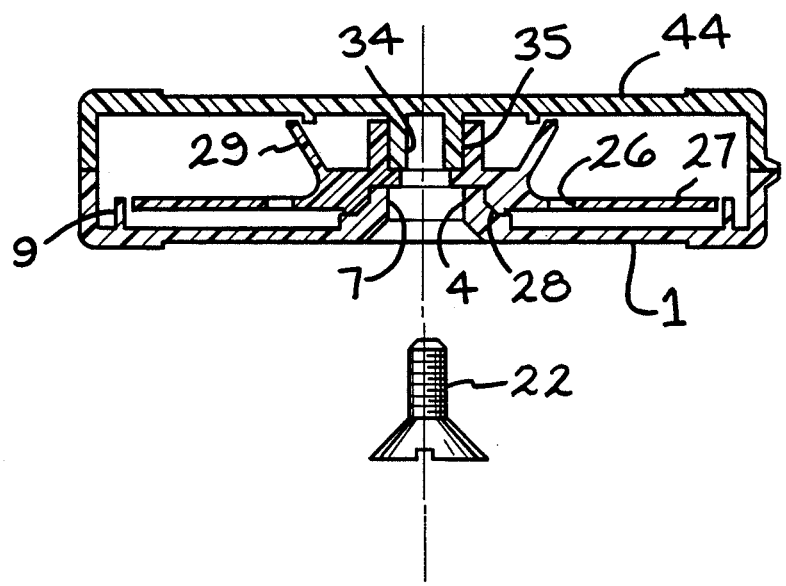
FIG. 6 is a cross section of the assembled cartridge showing the relationship of the components and the assembly screw.

The principal components and design of this tape cartridge invention are shown in FIGS. 1, 2 and 3 while the assembled views are shown in FIGS. 6 and 7.

Referring to FIG. 1, a cartridge base 1 has four corner tape guide posts 2 which also serve as press fit assembly posts when pressed into four cover index flanges 33 (see FIG. 3). When the cartridge is assembled, base flanges 3 (FIG. 1) and the cover flanges 33 are slightly over 150 mills apart to form a guide channel for 150 mill magnetic tape. A center post 4 on the cartridge base 1 mounts a tape disk 27 (FIG. 2). A tape disk cone 29 at the center of the tape disk 27 has a taper at the base of a hub 28 to conform to a taper 6 on the lower end of the post 4, to insure a smooth self-centering disk 27 rotation slightly above a bearing flange 5 defined in the center of the base 1. A hole 7 in the post 4 receives a center 35 depending from a cover 44 (FIG. 3). The center post 35 has a hole 34 to receive a self tapping screw 22 (FIG. 1) to firmly lock the assembled cartridge. This arrangement permits for opening the cartridge without defacing any label on the cover top (See FIG. 3).

Referring to FIGS. 1 and 7, "spill-chambers" 8 are provided to accommodate the natural irregularity of slack tape loops that form when the outer strand does not return to the mass as fast as the center strand emerges from adjacent the center disk cone 29.

Other design features to avoid tape tangles include a circular flange 9 in FIG. 1 that forms a guard rail slightly higher than the adjacent tape disk 27. This prevents the tape from winding under the disk 27. Also a guard rail 36 in the cover 44 (FIG. 3) protrudes downwardly into the cone 29. In the event of a tape loop feed out, in prior art continuous loop cartridges, there often was no convenient method to retrieve the loop for normal operation. Corrections in such prior art cartridges requires complete disassembly of the cartridge to rewind the tape. This is not a simple task and results in many discarded cartridges.

The present invention provides a solution. By placing the tip of a tooth pick or a paper clip in a rear cover slot 46 (See FIG. 7), the tape can be pulled outwardly through an editing window 21 (FIG. 1). The feed out loop at the front is thus pulled back into normal play position and the rear tape loop 47 feeds back into the mass at the tape periphery 50 (FIG. 7) when the cartridge is returned to "play".

The same operation of loop retrieval serves as a unique method to splice and edit a continuous loop without removal from the loaded cartridge. For example, a continuous loop is often used for a series of short messages with timing controlled by a short conductive or reflective tape applied at the desired intervals. These spot signals can be applied or removed by use of the editing or rear cover slot 46.

Still another feature to avoid "tape tangles" is shown in FIG. 1 where a stripper post 12 is mounted close to a pressure roller 10, at the point where the "peel-off" from the roller continues to flow into the front channel and around one of the posts 2 into the spill chamber 8. A recess slot 14 allows for proper alignment of the tape as it passes across a head recess chamber 13 (FIG. 1). The recess chamber 13 is provided with tape guide posts 17 and recess slots 15 for a "Mu-metal" shield and pressure pad assembly 24 shown in FIG. 7.

Referring to the inside cover view shown (FIG. 3), it can be seen that cover front flanges 30 extend downward so as to cover the entire front tape channel of the base when assembled. This simplifies the tape loading operation by gentle alignment of the tape into position with the front channel.

Index circular flanges 31, 33 and holes 32 in the cover 44 (FIG. 3) serve to engage their counterparts in the base 1 to maintain assembled alignment. The final assembly self tapping screw 22 (FIG. 1) can be removed without disturbing any top label on the cover of the cartridge.

Figure 5:
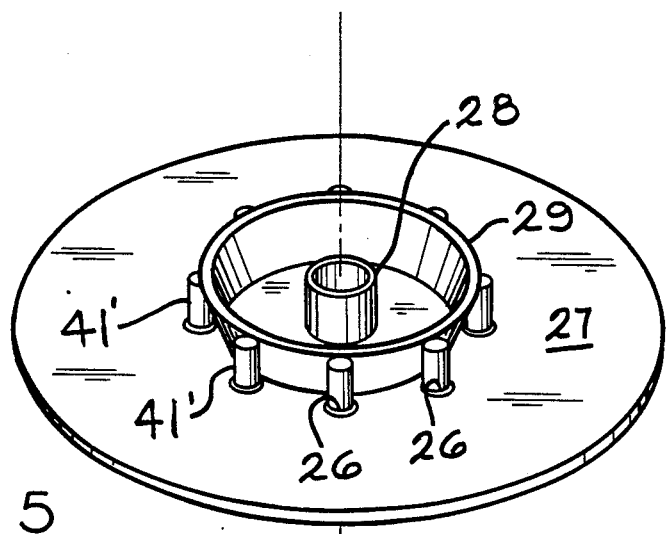
FIG. 5 is a perspective view of the disk when positioned upon the loading spindle and showing the tape loading spindle fingers in proper relationship to the disk cone.
Figure 4:
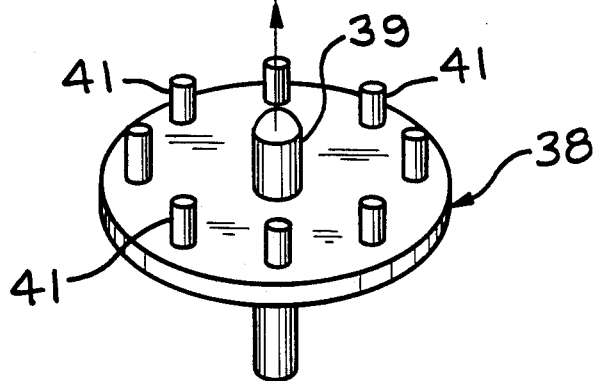
FIG. 4 is a perspective view of a tape loading spindle which engages holes in the disk for the tape winding operation.

Referring to FIGS. 4 and 5, holes 26 are provided in the tape disk 27 for automatic loading operations. One of the most costly and time consuming problems in standard tape loading is the tight binding of the starting tape strands around the center cone 29. To permit the tape to emerge freely from the mass, while in operation, there is provided a "free loop gap" at point 45, FIG. 7. The size of this "gap" varies in direct relation to the tape footage in the mass.

To perform the loading operation manually, in prior art devices, the center strand must be pulled firmly from the cone. This causes distortion of the emerging strand which must be cut away and discarded. This must then be followed by pulling on tape ends to establish the desired "free-loop" length and for final splicing.

To automatically perform the above costly operation, the present invention utilizes a tape loading jig spindle 38 (FIG. 4) which has a centering indexing shaft 39. A plurality of indexing fingers 41 extend upwardly and engage the tape disk holes 26. The fingers 41 come to rest just under the outer perimeter of cone 29 (FIG. 5). Upon removing the disk 27 from the loading spindle 38 (FIG. 4) the center strand 45 (See FIG. 7) can be removed freely without distorting the tape. The size of the tape gap left around the cone 29 determines the length of the "free-loop" after the ends are spliced. An assortment of loading spindles provides the desired "tape-gap" required for any given length of tape mass.

Loading spindles with removable or revolving oblong fingers also serve for the fine adjustments required to provide the proper "tape-gap" for any given size of tape footage on a given production run.

Referring to FIG. 7, a groove 48 is provided in parallel relationship on the top and bottom of the cartridge to provide a guide channel for the shipping and storage clip 34. The clip 34 is generally U-shaped. The groove 49 also serves as a manual retainer guide in a numbered storage rack, such as used in a broadcast station, to provide quick selection for spot announcements or music selections.

Additional selection is provided for automatic program retrieval by using "finger notches" 19 (FIG. 7) as a means for mounting cartridges between two parallel tracks. Preprogrammed selections can then be made for automatic handling.

Various modifications and revisions may be made to the above described embodiments without departing from the scope of the following claims.

What I claim:

1. A tape cartridge for holding an endless coil of tape comprising, in combination, a cartridge base and a mating cartridge cover, a disk for supporting the tape mounted for rotation in said base, said base and said cover having a front and a rear, first guide means for guiding a portion of the tape parallel to the front of said base and cover, said front having an opening therein to allow transducing of said tape, second guide means for guiding a portion of the tape parallel to the rear of said base and cover and an editing slot defined at said rear, whereby a portion of the tape may be pulled through said editing slot to edit the tape or correct tape feed out.

2. A magnetic tape cartridge, according to claim 1, including a channel defined adjacent the front of the cartridge and generally U-shaped shipping and storage clip removably mounted in said channel.

3. A magnetic tape cartridge, according to claim 1, wherein a pressure roller is mounted in said cartridge adjacent the front of the cartridge and a stripper post mounted adjacent said pressure roller, said stripper post directing tape away from said pressure roller.

4. A magnetic tape cartridge, according to claim 3, wherein said second guide means comprise a corner guide post mounted in each corner of said cartridge, wherein said guide posts at the rear corner of said cartridge direct the tape past said editing slot.

5. A magnetic tape cartridge, according to claim 1, including spill chambers defined in the front of said cartridge for accommodating slack tape loops.

6. A magnetic tape cartridge, according to claim 1, including a circular guard rail extending upwardly from said base in surrounding relationship to said disk.

7. A magnetic tape cartridge, according to claim 6, wherein said guard rail and said base define a circular recess which receives said disk.

8. A magnetic tape cartridge, according to claim 1, including a cone extending upwardly from said disk, a plurality of holes extending through said disk adjacent said cone, a tape loading jig spindle having a plurality of upwardly extending indexing fingers, whereby said indexing fingers are received by said disk holes during tape loading to provide a proper free loop gap.

9. A tape cartridge for holding an endless coil of tape comprising, in combination, a cartridge base and a mating cartridge cover, a disk for supporting the tape mounted for rotation in said base, said base and said cover having a front and a rear, guide means for guiding a portion of the tape parallel to the front of said base and cover, an editing slot defined at said rear, whereby a portion of the tape may be pulled through said editing slot to edit the tape or correct tape feed out, a cone extending upwardly from said disk a plurality of holes extending through said disk adjacent said cone, and a tape loading jig spindle having a plurality of upwardly extending indexing fingers, whereby said indexing fingers are received by said disk holes during tape loading to provide a proper free loop gap.

10. A magnetic tape cartridge, according to claim 9, wherein said disk includes a tubular center post and said tape loading jig spindle includes an indexing shaft which is received by said tubular center post during tape loading.

11. A magnetic tape cartridge, according to claim 10, wherein said center post defines a taber which mates with said base to insure smooth self centering disk operation.

* * * * *